United States Patent
Lin et al.

(10) Patent No.: US 9,703,347 B2
(45) Date of Patent: Jul. 11, 2017

(54) MOTHERBOARD WITH BACKUP POWER AND OPERATION SYSTEM UTILIZING THE SAME

(71) Applicant: GIGA-BYTE TECHNOLOGY CO., LTD., New Taipei (TW)

(72) Inventors: Hou-Yuan Lin, New Taipei (TW); Tse-Hsine Liao, New Taipei (TW); Hung-Cheng Chen, New Taipei (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 67 days.

(21) Appl. No.: 14/792,297

(22) Filed: Jul. 6, 2015

(65) Prior Publication Data

US 2016/0274639 A1    Sep. 22, 2016

(30) Foreign Application Priority Data

Mar. 20, 2015    (TW) .............................. 104108914 A

(51) Int. Cl.
*G06F 1/30* (2006.01)
*H02J 9/06* (2006.01)
*G06F 1/26* (2006.01)

(52) U.S. Cl.
CPC .............. *G06F 1/30* (2013.01); *G06F 1/263* (2013.01); *G06F 1/305* (2013.01); *H02J 9/061* (2013.01)

(58) Field of Classification Search
CPC .. G06F 1/263; G06F 1/30; G06F 1/305; H02J 9/061
See application file for complete search history.

(56) References Cited

U.S. PATENT DOCUMENTS

| 6,275,946 | B1 * | 8/2001 | Meir | ........................ G06F 1/30 307/64 |
| 7,991,588 | B1 * | 8/2011 | Krieger | ..................... G06F 1/26 702/186 |
| 8,732,507 | B2 | 5/2014 | Beckhoff et al. | |
| 2007/0007824 | A1 | 1/2007 | Chen et al. | |

(Continued)

FOREIGN PATENT DOCUMENTS

| CN | 101859173 A | 10/2010 |
| JP | 2000-501278 | 2/2000 |

(Continued)

OTHER PUBLICATIONS

Office Action issued on Jun. 27, 2016 for the corresponding Application No. 104108914 in Taiwan.

(Continued)

*Primary Examiner* — Dennis M Butler
(74) *Attorney, Agent, or Firm* — Muncy, Geissler, Olds & Lowe, P.C.

(57) ABSTRACT

A motherboard with backup power providing an output voltage to at least one computer information apparatus and including a first power connection unit and an Uninterruptible Power Supply (UPS) is provided. The first power connection unit is configured to receive DC power. The DC power is provided by a power supply. The UPS provides the output voltage and detects the DC power. When the DC power is stable, the UPS provides the DC power as the output voltage. When the DC power is unstable, the UPS provides battery power as the output voltage.

11 Claims, 3 Drawing Sheets

(56) References Cited

U.S. PATENT DOCUMENTS

| | | | | |
|---|---|---|---|---|
| 2007/0278860 A1* | 12/2007 | Krieger | ................ | H02J 9/061 307/64 |
| 2011/0316336 A1* | 12/2011 | Okubo | ................ | G06F 1/266 307/23 |
| 2014/0101464 A1 | 4/2014 | Hsiao et al. | | |

FOREIGN PATENT DOCUMENTS

| | | |
|---|---|---|
| JP | 2012-523216 | 9/2012 |
| TW | I380557 | 12/2012 |
| TW | 201303568 A | 1/2013 |
| WO | WO2007/139577 A1 | 12/2007 |

OTHER PUBLICATIONS

European Search Report dated Jun. 21, 2016, as issued in corresponding Europe Patent Application No. 15175596.4 (9 pages).
Office Action issued on Jan. 25, 2017 in corresponding Japanese patent Application No. 2016-43826 (7 pages).

\* cited by examiner

MOTHERBOARD WITH BACKUP POWER AND OPERATION SYSTEM UTILIZING THE SAME

CROSS REFERENCE TO RELATED APPLICATIONS

This Application claims priority of Taiwan Patent Application No. 104108914, filed on Mar. 20, 2015, the entirety of which is incorporated by reference herein.

BACKGROUND OF THE INVENTION

Field of the Invention

The invention relates to a motherboard, and more particularly to a motherboard with backup power.

Description of the Related Art

With the development of technology, the popularity of computer devices has increased. Generally, each computer device operates by using external power. However, when the external power is unstable, the computer device may operate abnormally such that the computer device loses data.

BRIEF SUMMARY OF THE INVENTION

In accordance with an embodiment, a motherboard with backup power provides an output voltage to at least one computer information apparatus and comprises a first power connection unit, an Uninterruptible Power Supply (UPS). The first power connection unit is configured to receive DC power. The DC power is provided by a power supply. The UPS provides the output voltage and detects the DC power. When the DC power is stable, the UPS provides the DC power as the output voltage. When the DC power is unstable, the UPS provides battery power as the output voltage.

In accordance with a further embodiment, an operation system comprises a power supply, a motherboard and a computer information apparatus. The power supply provides DC power. The motherboard comprises a first power connection unit and a UPS. The first power connection unit is configured to receive the DC power. The UPS provides an output voltage and detects the DC power. When the DC power is stable, the UPS provides the DC power as the output voltage. When the DC power is unstable, the UPS provides battery power as the output voltage. The computer information apparatus receives the output voltage.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
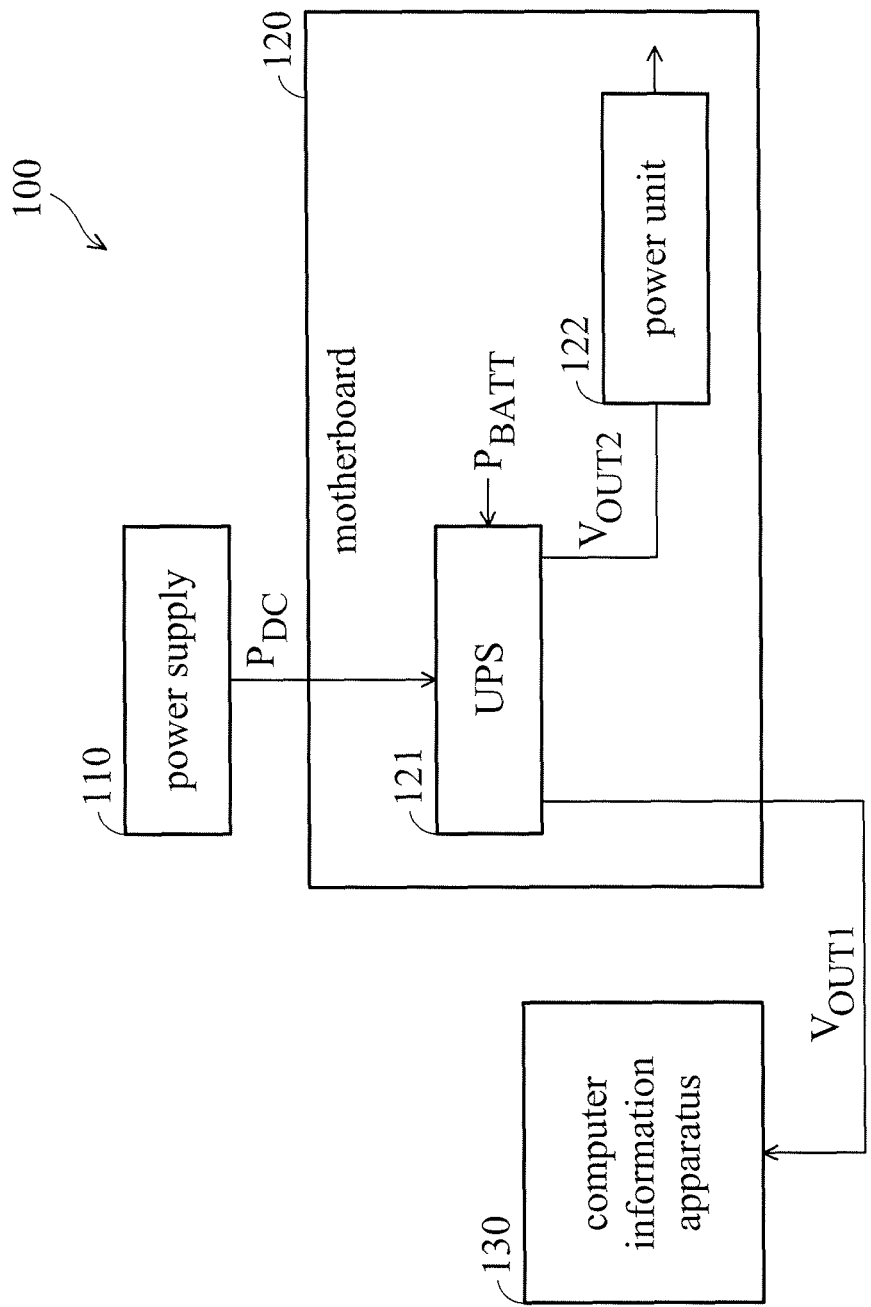
FIG. 1 is a schematic diagram of an exemplary embodiment of an operation system, in accordance with an embodiment of invention.

FIG. 1 is a schematic diagram of an exemplary embodiment of an operation system, in accordance with an embodiment of invention. The operation system 100 comprises a power supply 110, a motherboard 120 and a computer information apparatus 130. The power supply 110 provides DC power $P_{DC}$ to the motherboard 120. The invention does not limit the kind of power supply 110. Any device can serve as the power supply 110, as long as the device is capable of providing power to the motherboard 120. In one embodiment, the power supply 110 is an AC to DC inverter to transform mains supply from an AC form into a DC form. In some embodiments, the power supply 110 is a DC to DC inverter, such as a UPS.

The motherboard 120 generates an output voltage $V_{OUT1}$ according to the DC power $P_{DC}$. In this embodiment, a UPS 121 is embedded in the motherboard 120. The UPS 121 detects the DC power $P_{DC}$ and generates output voltages $V_{OUT1}$ and $V_{OUT2}$. When the DC power $P_{DC}$ is stable, the UPS 121 provides the DC power $P_{DC}$ as the output voltages $V_{OUT1}$ and $V_{OUT2}$. When the DC power $P_{DC}$ is unstable, the UPS 121 provides battery power $P_{BATT}$ as the output voltages $V_{OUT1}$ and $V_{OUT2}$.

In this embodiment, the output voltage $V_{OUT1}$ is provided to external devices (e.g. 130) outside of the motherboard 120. The output voltage $V_{OUT2}$ is provided to internal electronic elements inside of the motherboard 120. In one embodiment, the motherboard 120 further comprises a power unit 122. The power unit 122 transforms the output voltage $V_{OUT2}$ and drives electronic elements soldered on the motherboard 120 according to the transforming result. In one embodiment, the power unit 122 is a DC converter to adjust the voltage level of the output voltage $V_{OUT2}$. In another embodiment, the power unit 122 is integrated into the UPS 121. In some embodiments, the motherboard 120 further comprises at least one CPU and at least one memory. In this case, the CPU and the memory operate according to the output voltage $V_{OUT2}$.

The computer information apparatus 130 operates according to the output voltage $V_{OUT1}$. The invention does not limit the kind of computer information apparatus 130. Any device can serve as the computer information apparatus 130, as long as the device needs added DC power. For example, the computer information apparatus 130 receives the output voltage $V_{OUT1}$ via a power transmittal line. In one embodiment, the computer information apparatus 130 at least comprises a hard disk (HDD), a Solid State Disk (SSD), an Optical Disk Drive (ODD) and a Video Graphics Array (VGA) card.

Figure 2:
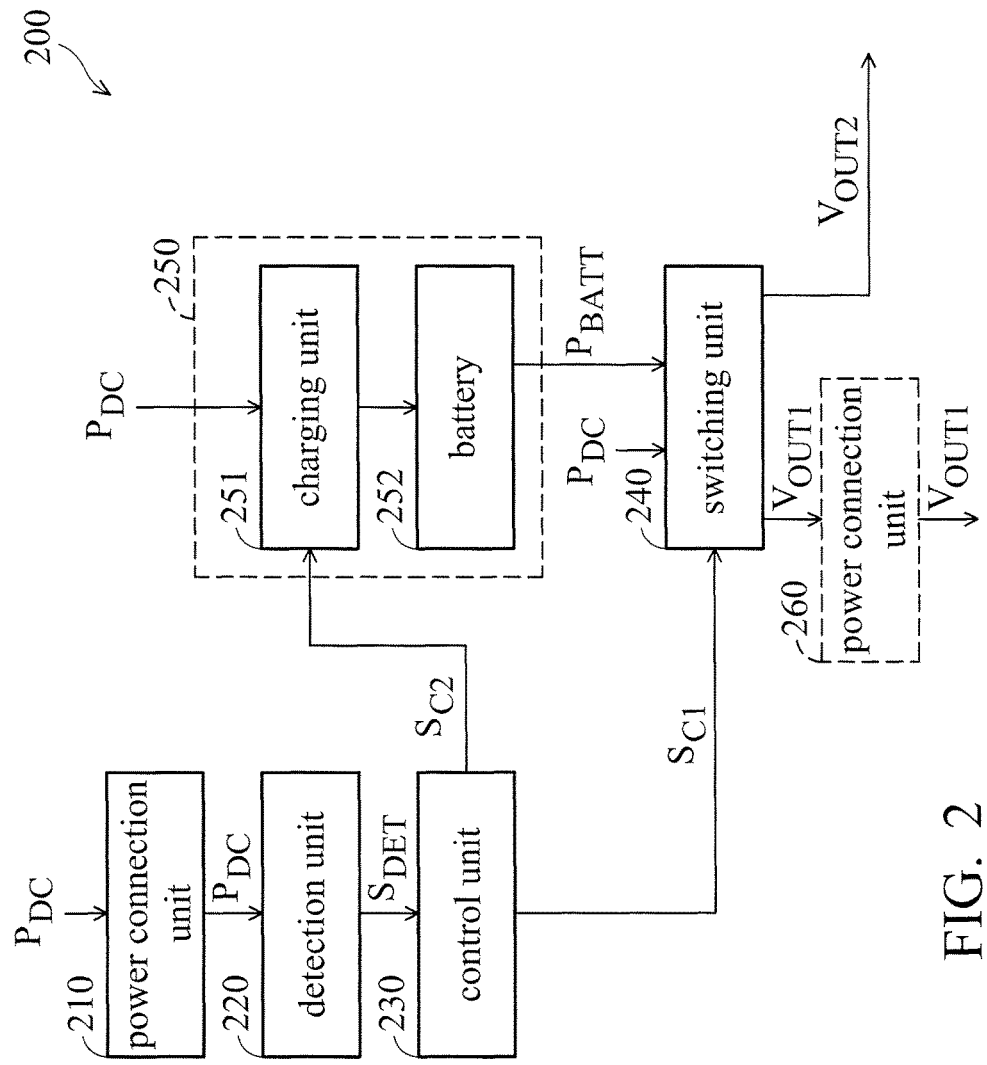
FIG. 2 is a schematic diagram of an exemplary embodiment of a UPS, in accordance with an embodiment of invention.

FIG. 2 is a schematic diagram of an exemplary embodiment of a UPS, in accordance with an embodiment of invention. In this embodiment, the UPS 200 comprises a power connection unit 210, a detection unit 220, a control unit 230, and a switching unit 240. The power connection unit 210 is configured to be coupled to an external power supply (e.g. 110) and receive the DC power $P_{DC}$. In this embodiment, the external power supply is disposed outside of the motherboard. In one embodiment, the DC power $P_{DC}$ provided by the external power supply has many voltage components, such as 12V, 5V and 3.3V.

The detection unit 220 detects the DC power $P_{DC}$ to generate a detection result $S_{DET}$. In one embodiment, the voltage level or the frequency of the detection result $S_{DET}$ relates to the variation of the DC power $P_{DC}$. For example, assuming that the DC power $P_{DC}$ is 12V. In this case, when the DC power $P_{DC}$ is stable, the level of the DC power $P_{DC}$ varies within a predetermined range, such as 11.4V~12.6V. In this case, the predetermined range is from the DC power $P_{DC}$ multiplied by 1.05 to the DC power $P_{DC}$ multiplied by 0.95. Therefore, when the level of the DC power $P_{DC}$ is within the predetermined range (e.g. 11.4V~12.6V), the detection unit 220 may generate the detection result $S_{DET}$ with a first frequency or a first voltage level.

However, when the DC power $P_{DC}$ is unstable, the level of the DC power $P_{DC}$ is not within the predetermined range. Therefore, the detection unit 220 generates another detection result $S_{DET}$ with a second frequency or a second voltage level. In some embodiments, when the level of the DC power $P_{DC}$ is within the predetermined range, the level of the detection result $S_{DET}$ is a low level. When the level of the DC power $P_{DC}$ is not within the predetermined range, the level of the detection result $S_{DET}$ is a high level. In other embodiments, the detection unit 220 generates the corresponding detection result $S_{DET}$ according to the DC power $P_{DC}$. The control unit 230 determines whether the DC power $P_{DC}$ is stable according to the detection result $S_{DET}$. In this case, the detection unit 220 does not determine whether the DC power $P_{DC}$ is stable.

The invention does not limit how the predetermined range is defined. In one embodiment, the designer who designs the motherboard stores the predetermined range in the detection unit 220 or the control unit 230 in advance. In another embodiment, the predetermined range is set by the user. The user is capable of utilizing a BIOS to set the predetermined range. In some embodiments, the predetermined range is a range from the DC power $P_{DC}$ multiplied by 1.07 to the DC power $P_{DC}$ multiplied by 0.93 or the DC power $P_{DC}$ multiplied by 1.1 to the DC power $P_{DC}$ multiplied by 0.9. In one embodiment, if the DC power $P_{DC}$ has many voltage components, such as 12V, 5V, and 3.3V, when the level of each voltage component is within a corresponding predetermined range, it means that the DC power $P_{DC}$ is stable.

The control unit 230 generates a control signal $S_{C1}$ to control the switching unit 240 according to the detection result $S_{DET}$. In one embodiment, when the level of the DC power $P_{DC}$ is within a predetermined range, the control unit 230 utilizes the control signal $S_{C1}$ to control the switching unit 240 such that the switching unit 240 provides the DC power $P_{DC}$ as the output voltages $V_{OUT1}$ and $V_{OUT2}$. When the level of the DC power $P_{DC}$ is not within the predetermined range, the control unit 230 utilizes the control signal $S_{C1}$ to control the switching unit 240 such that the switching unit 240 provides battery power $P_{BATT}$ as the output voltages $V_{OUT1}$ and $V_{OUT2}$.

The invention does not limit how the switching unit 240 receives the DC power $P_{DC}$. In one embodiment, the switching unit 240 is directly coupled to the power connection unit 210 to receive the DC power $P_{DC}$. In another embodiment, the control unit 230 provides the DC power $P_{DC}$ to the switching unit 240. In some embodiments, the control unit 230 may directly receive the DC power $P_{DC}$ provided by the power connection unit 210 or receive the DC power $P_{DC}$ via the detection unit 220.

Furthermore, the invention does not limit the method of generating battery power $P_{BATT}$. In one embodiment, the UPS 200 further comprises a backup power unit 250. The backup power unit 250 comprises a charging unit 251 and a battery 252. The charging unit 251 charges the battery 252 according to the control signal $S_{C2}$. The battery 252 provides the battery power $P_{BATT}$ to the switching unit 240.

In this embodiment, when the DC power $P_{DC}$ is stable, the control unit 230 utilizes the control signal $S_{C2}$ to trigger the charging unit 251. At this time, the charging unit 251 charges the battery 252 according to the DC power $P_{DC}$. When the DC power $P_{DC}$ is unstable, the control unit 230 utilizes the control signal $S_{C2}$ to stop triggering the charging unit 251. At this time, the charging unit 251 stops charging the battery 252. In one embodiment, the charging unit 250 is coupled to the power connection unit 210 to directly receive the DC power $P_{DC}$. In another embodiment, the detection unit 220 or the control unit 230 provides the DC power $P_{DC}$ to the charging unit 251.

In some embodiments, the control unit 230 only generates a single control signal (e.g. $S_{C1}$) and utilizes the single control signal to control the switching unit 240 and the charging unit 251. For example, when the level of the DC power $P_{DC}$ is within the predetermined range, the control unit 230 utilizes the control signal $S_{C1}$ to trigger the charging unit 251 such that the charging unit 251 charges the battery 252. The control unit 230 utilizes the control signal $S_{C1}$ to control the switching unit 240 such that the switching unit 240 provides the DC power $P_{DC}$ as the output voltage $V_{OUT1}$. When the level of the DC power $P_{DC}$ is not within the predetermined range, the control unit 230 utilizes the control signal $S_{C1}$ to control the charging unit 251 such that the charging unit 251 stops charging the battery 252 and utilizes the control signal $S_{C1}$ to control the switching unit 240 such that the switching unit 240 provides the battery power $P_{BATT}$ as the output voltage $V_{OUT1}$.

In this embodiment, the UPS 200 further comprises a power connection unit 260. The power connection unit 260 is configured to be coupled to the computer information apparatus 130. In one embodiment, the power connection unit 260 directly provides the output voltage $V_{OUT1}$ to the external computer information apparatus (e.g. 130). In another embodiment, the power connection unit 260 comprises a voltage converting module (not shown) to transform the level of the output voltage $V_{OUT1}$ and provides the transformed result to the computer information apparatus.

When the DC power $P_{DC}$ is stable, the UPS 200 utilizes the DC power $P_{DC}$ to provide the output voltage $V_{OUT1}$ to the external computer information apparatus. When the DC power $P_{DC}$ is unstable, the UPS 200 utilizes the battery power $P_{BATT}$ to provide the output voltage $V_{OUT1}$ to the external computer information apparatus such that the operation of the computer information apparatus is maintained.

In one embodiment, when the DC power $P_{DC}$ is unstable, the control unit 230 can provide a control command to the external computer information apparatus to end the operation of the external computer information apparatus. In other embodiments, the control unit 230 can send information to notify a user via a network.

Figure 3:
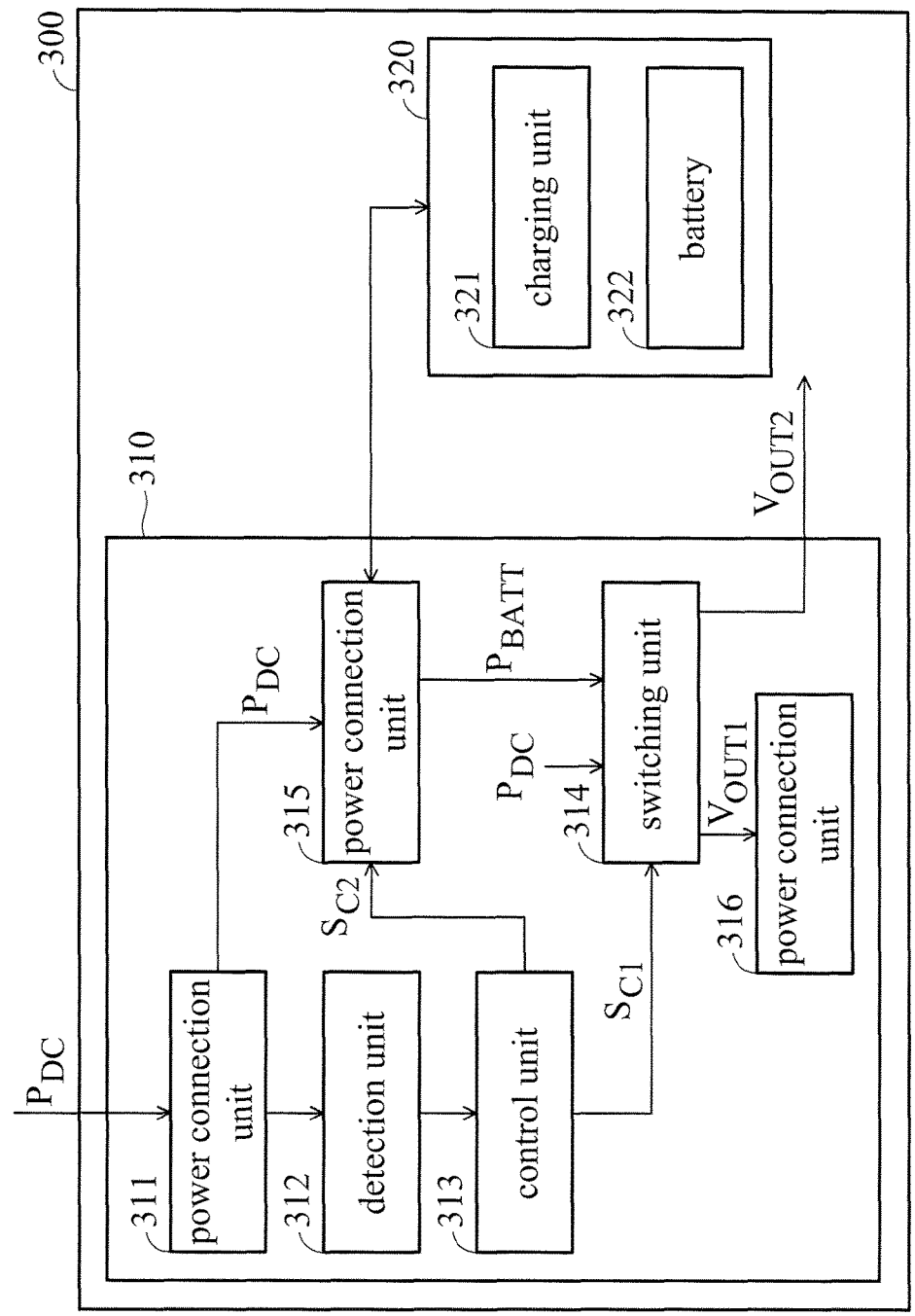
FIG. 3 is a schematic diagram of an exemplary embodiment of a motherboard, in accordance with an embodiment of invention.

FIG. 3 is a schematic diagram of an exemplary embodiment of a motherboard, in accordance with an embodiment of invention. In this embodiment, the motherboard 300 comprises a UPS 310 and a backup power unit 320. The UPS 310 and backup power unit 320 are embedded in the motherboard 300. As shown in FIG. 3, the UPS 310 comprises a power connection unit 311, a detection unit 312, a control unit 313, a switching unit 314, a power connection unit 315 and 316. Since the operation of the power connection unit 311, the detection unit 312, the control unit 313 and the switching unit 314 are the same as the operation of the power connection unit 210, the detection unit 220, the control unit 230 and the switching unit 240, descriptions of the power connection unit 311, the detection unit 312, the control unit 313 and the switching unit 314 are omitted for brevity.

In this embodiment, the power connection unit 315 is configured to be coupled to the backup power unit 320. When the level of the DC power $P_{DC}$ is within the predetermined range, the control unit 313 utilizes the control signal $S_{C2}$ to control the power connection unit 315 such that the power connection unit 315 provides the DC power $P_{DC}$ to the backup power unit 320. The charging unit 321 of the backup power unit 320 charges the battery 322 according to the DC power $P_{DC}$. When the level of the DC power $P_{DC}$ is not within the predetermined range, the control unit 313 utilizes the control signal $S_{C2}$ to control the power connection unit 315 such that the power connection unit 315 transmits the battery voltage $P_{BATT}$ of the battery 322 to the switching unit 314.

The invention does not limit the internal structure of the power connection unit 315. In one embodiment, the power connection unit 315 comprises a Peripheral Component Interconnect (PCI) connector or a PCIe (PCI Express) connector to be coupled to the backup power unit 320. The motherboard 300 comprises an expanded interface to connect to the backup power unit 320, therefore, the backup power unit 320 can be embedded in the motherboard 300.

The UPS 310 detects the DC power $P_{DC}$ provided by an external power supply to maintain the operation of the external computer information apparatus normally. For example, when the DC power $P_{DC}$ is stable, the motherboard 300 utilizes the DC power $P_{DC}$ to drive the external computer information apparatus. When the DC power $P_{DC}$ is unstable, the motherboard 300 utilizes the battery power $P_{BATT}$ to drive the external computer information apparatus such that the external computer information apparatus does not lose data because the power received by the external computer information apparatus is stable power. Additionally, when the DC power $P_{DC}$ is unstable, the motherboard 300 can provide a control command to the external computer information apparatus such that the operation of the external computer information apparatus is ended.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A motherboard with backup power providing an output voltage to at least one computer information apparatus and comprising:
    a first power connector comprising an input terminal configured to receive DC power, wherein the DC power is provided by a power supply;
    an Uninterruptible Power Supply (UPS) coupled to the first power connector, providing the output voltage and detecting the DC power, wherein the UPS comprises an input terminal to receive the DC power and an output terminal to provide the output voltage, and when the DC power is stable, the UPS provides the DC power as the output voltage, and when the DC power is unstable, the UPS provides battery power as the output voltage;
    a backup power device comprising a battery and coupled to the UPS to provide the battery power, wherein the battery is configured to provide the battery power; and
    a third power connector coupled to the backup power device, wherein the third power connector comprises a first input terminal receiving the DC power, a first output terminal providing the DC power to the backup power device or receiving the battery power and a second output terminal providing the battery power to a switch, and when a level of the DC power is within a predetermined range, the third power connector provides the DC power to the backup power device, and when the level of the DC power is not within the predetermined range, the third power connector provides the battery power to the switch, wherein the third power connector comprises a Peripheral Component Interconnect (PCI) connector or a PCIe (PCI Express) connector.

2. The motherboard with backup power as claimed in claim 1, wherein the UPS comprises:
    a detector coupled to the first power connector and detecting the DC power to generate a detection result, wherein the detector comprises an input terminal to receive the DC power and an output terminal to output the detection result; and
    a controller coupled to the output terminal of the detector and generating a control signal according to the detection result, wherein the controller comprises a first input terminal receiving the detection result and a first output terminal providing the control signal;
    wherein the switch is coupled to the first output terminal of the controller and generates the output voltage according to the control signal, wherein the switch comprises a first input terminal receiving the control signal, a second input terminal receiving the DC power, a third input terminal receiving the battery power, and an output terminal providing the output voltage, and when a level of the DC power is within a predetermined range, the switch provides the DC power as the output voltage, and when the level of the DC power is not within the predetermined range, the switch provides the battery power as the output voltage.

3. The motherboard with backup power as claimed in claim 2, wherein the backup power device comprises:
    a charging unit coupled between the controller and the battery and charging the battery according to the control signal, wherein the charging unit comprises a first input terminal receiving the control signal, a second input terminal receiving the DC power, and an output terminal coupled to the battery, and when a level of the DC power is within a predetermined range, the charging unit charges the battery according to the DC power, and when the level of the DC power is not within the predetermined range, the charging unit stops charging the battery.

4. The motherboard with backup power as claimed in claim 3, wherein the controller further comprises a second input terminal to receive the DC power and a second output terminal to provide the DC power to the switch.

5. The motherboard with backup power as claimed in claim 1, further comprising:

a second power connector configured to be coupled to the computer information apparatus.

6. The motherboard with backup power as claimed in claim 1, wherein the computer information apparatus comprises a hard disk, an Optical Disk Drive (ODD) or a Video Graphics Array (VGA) card.

7. The motherboard with backup power as claimed in claim 1, wherein the backup power device comprises:
a battery configured to provide the battery power; and
a charging unit coupled between the third power connector and the battery to charge the battery according to the DC power.

8. The motherboard with backup power as claimed in claim 7, wherein the first power connector provides the DC power to the UPS.

9. A control method for an operation system comprising:
receiving DC power;
detecting the DC power;
providing the DC power to a computer information apparatus when the DC power is stable;
providing battery power to the computer information apparatus when the DC power is unstable;
providing the DC power to a third power connector to charge a battery when a level of the DC power is within a predetermined range; and
activating the third power connector to output the battery power when the level of the DC power is not within the predetermined range, wherein the third power connector comprises a Peripheral Component Interconnect (PCI) connector or a PCIe (PCI Express) connector.

10. The control method as claimed in claim 9,
wherein when the level of the DC power is within the predetermined range, the DC power is provided to the computer information apparatus, and when the level of the DC power is not within the predetermined range, the battery power is provided to the computer information apparatus.

11. The control method as claimed in claim 10, further comprising:
stopping the charging of the battery when the level of the DC power is not within the predetermined range.

* * * * *